US007809448B2

(12) United States Patent
Lys et al.

(10) Patent No.: US 7,809,448 B2
(45) Date of Patent: Oct. 5, 2010

(54) SYSTEMS AND METHODS FOR AUTHORING LIGHTING SEQUENCES

(75) Inventors: Ihor A. Lys, Milton, MA (US); Frederick M. Morgan, Quincy, MA (US); Kevin J. Dowling, Westford, MA (US); Michael K. Blackwell, Milton, MA (US)

(73) Assignee: Philips Solid-State Lighting Solutions, Inc., Burlington, MA (US)

( * ) Notice: Subject to any disclaimer, the term of this patent is extended or adjusted under 35 U.S.C. 154(b) by 40 days.

(21) Appl. No.: 11/561,031

(22) Filed: Nov. 17, 2006

(65) Prior Publication Data

US 2007/0086754 A1 Apr. 19, 2007

Related U.S. Application Data

(62) Division of application No. 09/616,214, filed on Jul. 14, 2000, now Pat. No. 7,139,617.

(60) Provisional application No. 60/143,790, filed on Jul. 14, 1999.

(51) Int. Cl.

| | |
|---|---|
| ***G05B 11/01*** | (2006.01) |
| ***G05B 19/18*** | (2006.01) |
| ***G05B 15/00*** | (2006.01) |
| ***H05B 37/02*** | (2006.01) |

(52) U.S. Cl. ............................... 700/12; 700/2; 700/14; 700/23; 700/83; 700/275; 315/297; 315/308; 315/360

(58) Field of Classification Search ..................... 700/1, 700/2, 9–12, 14–17, 23, 83, 90, 275; 315/292, 315/293, 297, 307–309, 316, 360

See application file for complete search history.

(56) References Cited

U.S. PATENT DOCUMENTS

| | | | | |
|---|---|---|---|---|
| 3,898,643 | A | | 8/1975 | Ettlinger |
| 4,514,817 | A | * | 4/1985 | Pepper et al. ............... 340/644 |
| 4,947,302 | A | | 8/1990 | Callahan |
| 4,962,687 | A | | 10/1990 | Belliveau et al. |
| 5,209,560 | A | | 5/1993 | Taylor et al. |
| 5,307,295 | A | | 4/1994 | Taylor et al. |
| 5,357,170 | A | * | 10/1994 | Luchaco et al. ............. 315/159 |
| 5,406,176 | A | | 4/1995 | Sugden |

(Continued)

FOREIGN PATENT DOCUMENTS

DE 4111397 A1 10/1992

(Continued)

OTHER PUBLICATIONS

Multivision, Trax Media Control, *Production Partner*, Aug. 1997, pp. 82-83, (also 2 unnumbered pages).

Dorsey et al., Interactive Design of Complex Time-Dependent Lighting, *IEEE Computer Graphics and Applications*, Mar. 1995, pp. 26-36.

(Continued)

*Primary Examiner*—Sean P Shechtman

(57) ABSTRACT

The systems and methods descried herein relate in part to intuitive methods for creation and design of lighting sequences, e.g., for theatrical, entertainment or advertising purposes, using a software interface. Additionally, the lighting sequences can be coordinated with control of additional devices. Also described herein is a controller capable of executing programs for lighting sequences and modifying the output and/or execution of the program based on external signals. In this way, the final output can be made responsive to external stimuli, or even interactive.

57 Claims, 8 Drawing Sheets

U.S. PATENT DOCUMENTS

| | | | |
|---|---|---|---|
| 5,621,282 | A | 4/1997 | Haskell |
| 5,629,587 | A | 5/1997 | Gray et al. |
| 5,659,793 | A | 8/1997 | Escobar et al. |
| 5,732,184 | A | 3/1998 | Chao et al. |
| 5,769,527 | A | 6/1998 | Taylor et al. |
| 5,811,940 | A * | 9/1998 | Nutzel ........................ 315/291 |
| 5,838,226 | A * | 11/1998 | Houggy et al. ......... 340/310.11 |
| 5,945,993 | A | 8/1999 | Fleischmann |
| 5,971,598 | A * | 10/1999 | Baba et al. .................. 700/296 |
| 6,016,038 | A | 1/2000 | Mueller et al. |
| 6,020,825 | A | 2/2000 | Chansky et al. |
| 6,031,343 | A | 2/2000 | Recknagel et al. |
| 6,150,774 | A | 11/2000 | Mueller et al. |
| 6,166,496 | A | 12/2000 | Lys et al. |
| 6,211,626 | B1 | 4/2001 | Lys et al. |
| 6,292,901 | B1 | 9/2001 | Lys et al. |
| 6,340,868 | B1 | 1/2002 | Lys et al. |
| 6,361,198 | B1 * | 3/2002 | Reed .......................... 362/554 |
| 6,459,919 | B1 | 10/2002 | Lys et al. |
| 6,466,234 | B1 | 10/2002 | Pyle et al. |
| 6,495,964 | B1 | 12/2002 | Muthu et al. |
| 6,528,954 | B1 | 3/2003 | Lys et al. |
| 6,548,967 | B1 | 4/2003 | Dowling et al. |
| 6,577,080 | B2 | 6/2003 | Lys et al. |
| 6,608,453 | B2 | 8/2003 | Morgan et al. |
| 6,624,597 | B2 | 9/2003 | Dowling et al. |
| 6,717,376 | B2 | 4/2004 | Lys et al. |
| 6,720,745 | B2 | 4/2004 | Mueller et al. |
| 6,774,584 | B2 | 8/2004 | Lys et al. |
| 6,777,891 | B2 | 8/2004 | Lys et al. |
| 6,781,329 | B2 | 8/2004 | Morgan et al. |
| 6,788,011 | B2 | 9/2004 | Mueller et al. |
| 6,801,003 | B2 | 10/2004 | Schanberger et al. |
| 6,806,659 | B1 | 10/2004 | Mueller et al. |
| 6,869,204 | B2 | 3/2005 | Morgan et al. |
| 6,883,929 | B2 | 4/2005 | Dowling |
| 6,888,322 | B2 | 5/2005 | Dowling et al. |
| 6,897,624 | B2 | 5/2005 | Ducharme et al. |
| 6,936,978 | B2 | 8/2005 | Morgan et al. |
| 6,965,205 | B2 | 11/2005 | Piepgras et al. |
| 6,967,448 | B2 | 11/2005 | Morgan et al. |
| 6,969,954 | B2 | 11/2005 | Lys |
| 6,975,079 | B2 | 12/2005 | Lys et al. |
| 7,031,920 | B2 | 4/2006 | Dowling et al. |
| 2002/0038157 | A1 | 3/2002 | Dowling et al. |
| 2002/0048169 | A1 | 4/2002 | Dowling et al. |
| 2002/0070688 | A1 | 6/2002 | Dowling et al. |
| 2002/0074559 | A1 | 6/2002 | Dowling et al. |
| 2002/0078221 | A1 | 6/2002 | Blackwell et al. |
| 2002/0130627 | A1 | 9/2002 | Dowling et al. |
| 2002/0145394 | A1 | 10/2002 | Morgan et al. |
| 2002/0145869 | A1 | 10/2002 | Dowling |
| 2002/0152045 | A1 | 10/2002 | Dowling et al. |
| 2002/0158583 | A1 | 10/2002 | Lys et al. |
| 2002/0176259 | A1 | 11/2002 | Ducharme |
| 2003/0011538 | A1 | 1/2003 | Lys et al. |
| 2003/0018609 | A1 | 1/2003 | Phillips et al. |
| 2003/0028260 | A1 | 2/2003 | Blackwell |
| 2003/0057884 | A1 | 3/2003 | Dowling et al. |
| 2003/0057887 | A1 | 3/2003 | Dowling et al. |
| 2003/0076281 | A1 | 4/2003 | Morgan et al. |
| 2003/0100837 | A1 | 5/2003 | Lys et al. |
| 2003/0133292 | A1 | 7/2003 | Mueller et al. |
| 2003/0222587 | A1 | 12/2003 | Dowling et al. |
| 2004/0036006 | A1 | 2/2004 | Dowling |
| 2004/0052076 | A1 | 3/2004 | Mueller et al. |
| 2004/0090191 | A1 | 5/2004 | Mueller et al. |
| 2004/0090787 | A1 | 5/2004 | Dowling et al. |
| 2004/0105261 | A1 | 6/2004 | Ducharme et al. |
| 2004/0116039 | A1 | 6/2004 | Mueller et al. |
| 2004/0130909 | A1 | 7/2004 | Mueller et al. |
| 2004/0178751 | A1 | 9/2004 | Mueller et al. |
| 2004/0212320 | A1 | 10/2004 | Dowling et al. |
| 2004/0212993 | A1 | 10/2004 | Morgan et al. |
| 2005/0099824 | A1 | 5/2005 | Dowling et al. |
| 2005/0116667 | A1 | 6/2005 | Mueller et al. |
| 2005/0151489 | A1 | 7/2005 | Lys et al. |
| 2005/0213352 | A1 | 9/2005 | Lys et al. |
| 2005/0213353 | A1 | 9/2005 | Lys |
| 2005/0218838 | A1 | 10/2005 | Lys |
| 2005/0218870 | A1 | 10/2005 | Lys |
| 2005/0219872 | A1 | 10/2005 | Lys |
| 2005/0231133 | A1 | 10/2005 | Lys |
| 2005/0236029 | A1 | 10/2005 | Dowling |
| 2005/0236998 | A1 | 10/2005 | Mueller |
| 2005/0253533 | A1 | 11/2005 | Lys et al. |
| 2005/0275626 | A1 | 12/2005 | Mueller |
| 2005/0276053 | A1 | 12/2005 | Nortrup |
| 2006/0002110 | A1 | 1/2006 | Dowling |
| 2006/0012987 | A9 | 1/2006 | Ducharme |
| 2006/0016960 | A1 | 1/2006 | Morgan |
| 2006/0022214 | A1 | 2/2006 | Morgan |
| 2006/0050509 | A9 | 3/2006 | Dowling |
| 2006/0076908 | A1 | 4/2006 | Morgan |
| 2006/0098077 | A1 | 5/2006 | Dowling |
| 2006/0104058 | A1 | 5/2006 | Chemel et al. |
| 2006/0109649 | A1 | 5/2006 | Ducharme et al. |
| 2006/0132061 | A1 | 6/2006 | McCormick et al. |
| 2006/0152172 | A9 | 7/2006 | Mueller |
| 2006/0158881 | A1 | 7/2006 | Dowling |
| 2006/0198128 | A1 | 9/2006 | Piepgras et al. |
| 2006/0208667 | A1 | 9/2006 | Lys |

FOREIGN PATENT DOCUMENTS

| | | | |
|---|---|---|---|
| EP | 0 495 305 | A2 | 7/1992 |
| EP | 0 495 305 | B1 | 7/1992 |
| EP | 0 752 632 | A1 | 1/1997 |
| FR | 2 628 335 | A1 | 9/1989 |
| JP | S64-19696 | A | 1/1989 |
| JP | 06-350816 | | 12/1994 |
| JP | 06-350816 | A | 12/1994 |
| JP | 10208886 | | 8/1998 |
| JP | 06-096603 | A | 4/2006 |
| WO | 89/05086 | A1 | 6/1989 |
| WO | WO 98/52175 | | 11/1998 |
| WO | 99/31560 | A3 | 6/1999 |

OTHER PUBLICATIONS

Opposition Brief, Aug. 2, 2006, by Zumtobel Lighting GmbH, opposing European Patent No. 1,224,845 B1, pp. 1-12.

Opposition Brief, Aug. 2, 2006, by ERCO Leuchten GmbH, opposing European Patent No. 1,224,845 B1, pp. 1-21.

"A Digital Video Primer," *Adobe*, 31 pgs. (Jun. 2000).

Congo, "The Avab board by ETC, datasheet from Electronic Theatre Controls," Jun. 6, 2005.

Ettlinger et al., "A CBS Computerized Lighting Control System," *Journal of the SMPTE*, vol. 81, pp. 277-281 (Apr. 1972).

Irving, D.C., "Techniques of Stage and Studio Lighting Control," *Proceedings of the IREE*, pp. 359-364 (Nov. 1975).

www.jandsvista.com/features.html, Nov. 8, 2005.

International Search Report mailed on Oct. 19, 2000.

* cited by examiner

SYSTEMS AND METHODS FOR AUTHORING LIGHTING SEQUENCES

CROSS-REFERENCES TO RELATED APPLICATIONS

This application claims the benefit under 35 U.S.C. §120 as a divisional (DIV) of U.S. Ser. No. 09/616,214, filed Jul. 14, 2000, and entitled "Systems and Methods for Authoring Lighting Sequences."

U.S. Ser. No. 09/616,214 in turn claims the benefit under 35 U.S.C. §119(e) of U.S. Provisional Application No. 60/143,790, filed Jul. 14, 1999, entitled "CKI Controller."

Each of the foregoing applications is incorporated herein by reference.

FIELD OF THE DISCLOSURE

The present invention relates generally to systems and methods for controlling lighting systems, and more particularly to computerized systems and methods for designing lighting sequences and executing such sequences on lighting systems.

BACKGROUND

Most modern-day lighting controllers are designed to control white light (or monochromatic light) in a theatrical or high-end business setting. A light producing monochromatic light, such as white, blue, or red, can be changed primarily along a single dimension—brightness—from off to a maximum brightness. Current controllers permit a user to specify a brightness for each light over time.

This method becomes increasingly more complicated for lights capable of changing the color of emitted light, because the resulting color and intensity is a combination of the intensity of three component primary colors, each of which can be set independent of the others for a particular light. Thus, the output is a function of three dimensions, rather than one, to be specified for each point in time, greatly increasing the effort and time involved in creating an effect. U.S. Pat. No. 5,307,295 to Taylor et al. describes a system for creating lighting sequences which simplifies some aspects of creating a lighting sequence, but many of the parameters still need to be specified for each light, much as they would be on a standard lighting console. A more intuitive method for designing lighting sequences would not only simplify and speed up the designing process, but would permit users to design lighting sequences with less training and experience than is often necessary today.

Furthermore, although sequences can be created and played back by traditional methods, the content of the sequences typically progresses with time and is not subject to modification during playback. For example, if a dramatic scene requires a flash of lightning to be simulated at a certain time, this effect is typically achieved either by meticulously timing the staging to make the programmed flash and the critical moment coincide, or by manually effecting the flash at the critical moment. Such techniques either require considerable reliance on chance or preclude reliance on automation.

A technique that permits an intuitive approach to designing lighting sequences would reduce the time and training required to achieve a desired effect, and would permit colored lights to be operated with a minimal impact on efficiency. Additionally, a method for executing such lighting sequences that promotes flexibility in the reproduction of the sequence will permit increased freedom in an associated performance, or allow use of programmed lighting sequences in situations which are inherently unpredictable.

SUMMARY

The systems and methods described herein relate to an intuitive interface for the design of lighting sequences, such as by providing a visual representation of a sequence as it is being designed. Additionally, the systems and methods described herein relate to reproduction of programmed lighting sequences such that the sequence can be modified during playback, e.g., based on external stimuli or cues.

A system for preparing a light sequence according to the principles of the invention may include an authoring interface displaying information representative of a plurality of lighting effects, and a sequence authoring module to permit a user to select a lighting effect, a lighting unit to execute the lighting effect, a start time for the lighting effect, and a stop time for the lighting effect.

A method for preparing a lighting sequence capable of being executed by a processor according to the principles of the invention may include providing a processor interface including information representative of a plurality of lighting effects, receiving information representative of a lighting unit, receiving information representative of a first lighting effect to be executed by the lighting unit, receiving information representative of a start time for the first lighting effect, and receiving information representative of a stop time for the first lighting effect.

In another aspect, a system for controlling a plurality of lighting units according to the principles of the invention may include a data interface for receiving instructions for controlling a plurality of lighting units, a signal interface for receiving external signals, a processor for converting said instructions to a data stream and for altering the conversion of said instructions based on the external signals received, and a data output for transmitting the data stream to a plurality of lighting units.

In another aspect, a method for controlling a plurality of lighting units according to the principles of the invention may include receiving instructions for controlling a plurality of lighting units, receiving external signals, converting said instructions to a data stream based on the external signals received, and transmitting the data stream to a plurality of lighting units.

In another aspect, a method for controlling a plurality of lighting units according to the principles of the invention may include receiving instructions including a primary lighting effect and a secondary lighting effect, the secondary lighting effect designated to be executed instead of the primary lighting effect upon a predetermined condition, sending instructions to a lighting unit to execute the primary lighting effect, receiving a signal indicative of the predetermined condition, and sending instructions to the lighting unit to execute the secondary lighting effect.

In another aspect, a method for controlling a plurality of lighting units according to the invention may include receiving instructions for executing a timed sequence of lighting effects, executing the sequence of lighting effects utilizing a plurality of lighting units, receiving an external signal, and altering the execution of the sequence of lighting effects.

BRIEF DESCRIPTION OF THE FIGURES

The following figures depict certain illustrative embodiments of the invention in which like reference numerals refer to like elements. These depicted embodiments are to be understood as illustrative of the invention and not as limiting in any way.

DETAILED DESCRIPTION

The description below pertains to several illustrative embodiments of the invention. Although many variations of the invention may be envisioned by one skilled in the art, such variations and improvements are intended to fall within the compass of this disclosure. Thus, the scope of the invention is not to be limited in any way by the disclosure below. The terms "sequence" or "light sequence," as used herein, are intended to refer to sequential displays, as well as non-sequential displays, flow-controlled displays, interrupt driven or event driven displays, or any other controlled, overlapping, or sequential displays with one or more lights.

Figure 1:
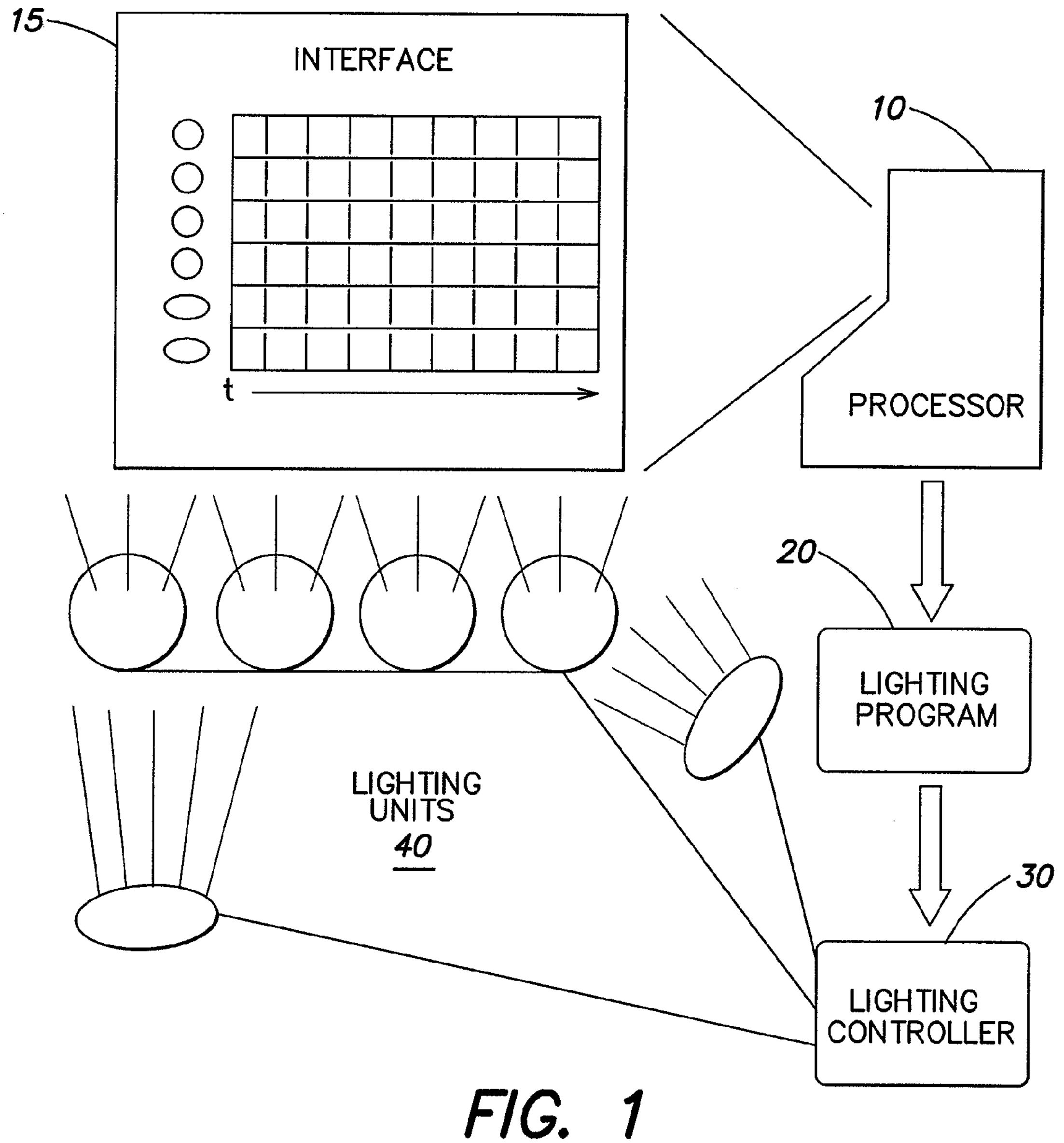
FIG. 1 illustrates a system for creating a lighting sequence and executing the lighting sequence on a plurality of lighting units as described herein.
Figure 1A:
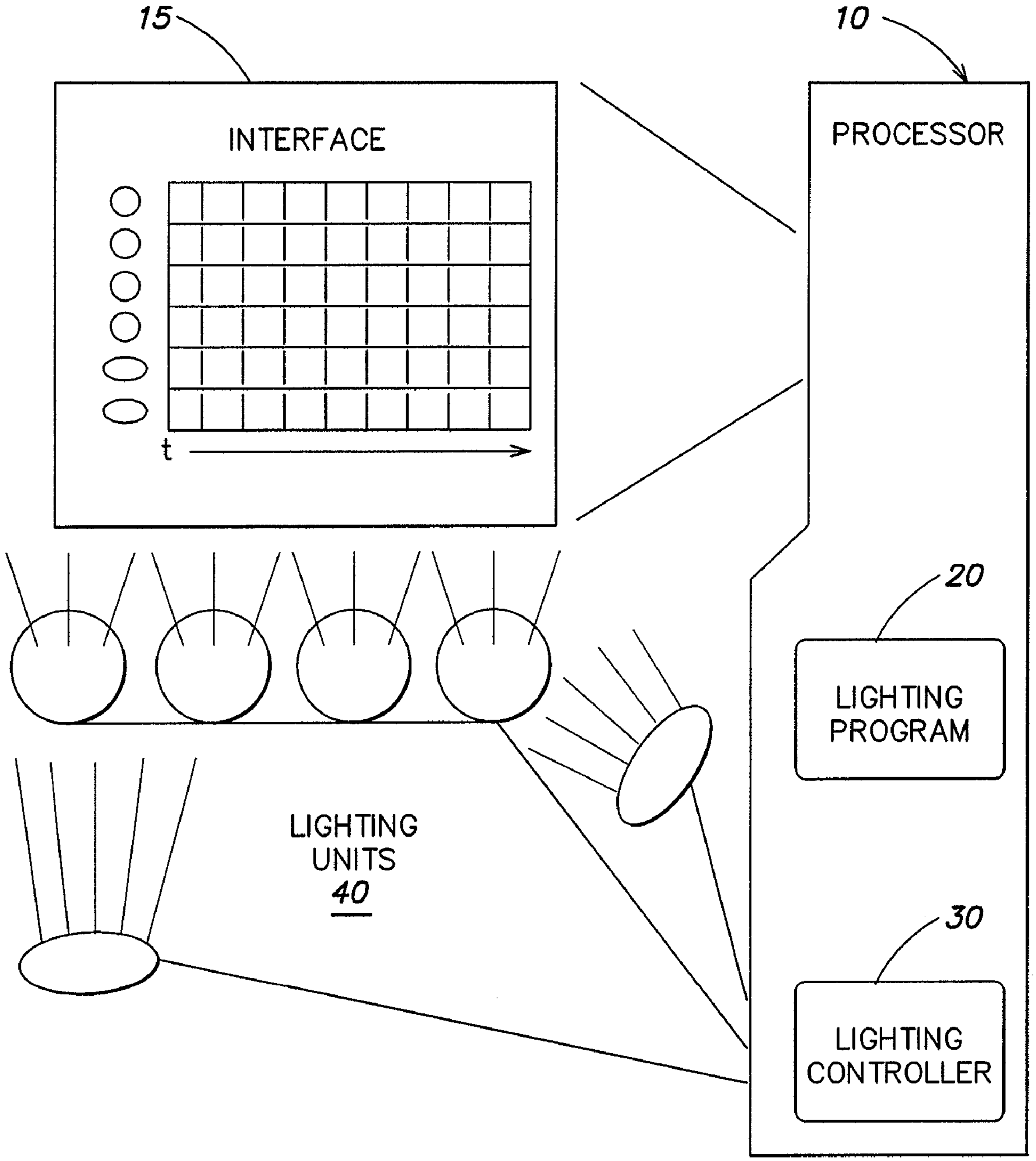
FIG. 1A illustrates a system for creating a lighting sequence and executing the lighting sequence on a plurality of lighting units, wherein a single component of the system may be used to create the lighting sequence and control the lighting units.

The systems and methods described herein relate to a system, such as a processor 10 supporting a software application having an interface 15, as depicted in FIG. 1, with which a user may create a lighting program 20, which may include one or more lighting sequences, capable of being executed by a lighting controller 30 which controls one or more lighting units 40. The term "sequence" in the context of this disclosure is used to refer to any pattern, show, sequence, arrangement or collection of commands used to operate lighting units or other devices through the system. One of skill in the art would recognize that a sequence would also not need to be an ordered sequence or have a linear design. Sequences comprising non-linear, priority-based, and/or overlapping commands may still comprise a sequence. The software application may be a stand-alone application, such as an executable image of a C++ or Fortran program or other executable code and/or libraries, or may be implemented in conjunction with or accessible by a Web browser, e.g., as a Java applet or one or more HTML web pages, etc. Processor 10 may be any system for processing in response to a signal or data and should be understood to encompass microprocessors, microcontrollers, other integrated circuits, computer software, computer hardware, electrical circuits, application-specific integrated circuits, personal computers, chips, and other devices alone or in combination capable of providing processing functions. For example, processor 10 can be any suitable data processing platform, such as a conventional IBM PC workstation operating the Windows operating system, or a SUN workstation operating a version of the Unix operating system, such as Solaris, or any other suitable workstation. Controller 30 may communicate with lighting units 40 by radio frequency (RF), ultrasonic, auditory, infrared (IR), optical, microwave, laser, electromagnetic, or any other transmission or connection method or system. Any suitable protocol may be used for transmission, including pulse-width modulated signals such as DMX, RS-485, RS-232, or any other suitable protocol. Lighting units 40 may be incandescent, LED, fluorescent, halogen, laser, or any other type of light source, e.g., configured so that each lighting unit is associated with a predetermined assigned address either unique to that lighting unit or overlapping the address of other lighting units. While the processor 10, the lighting program 20 and the lighting controller 30 are illustrated separately in FIG. 1 for clarity, in certain embodiments, a single component may be capable both of permitting a user to create a lighting program and controlling the lighting units. For example, FIG. 1A illustrates a processor 10 capable of permitting a user to create a lighting program and control the lighting units. The present invention is intended to encompass this and other variations on the system depicted in FIG. 1 which can be used to implement the methods described below. In certain embodiments, the functions of the software application may be provided by a hardware device, such as a chip or card, or any other system capable of providing any of the functions described herein.

Figure 2:
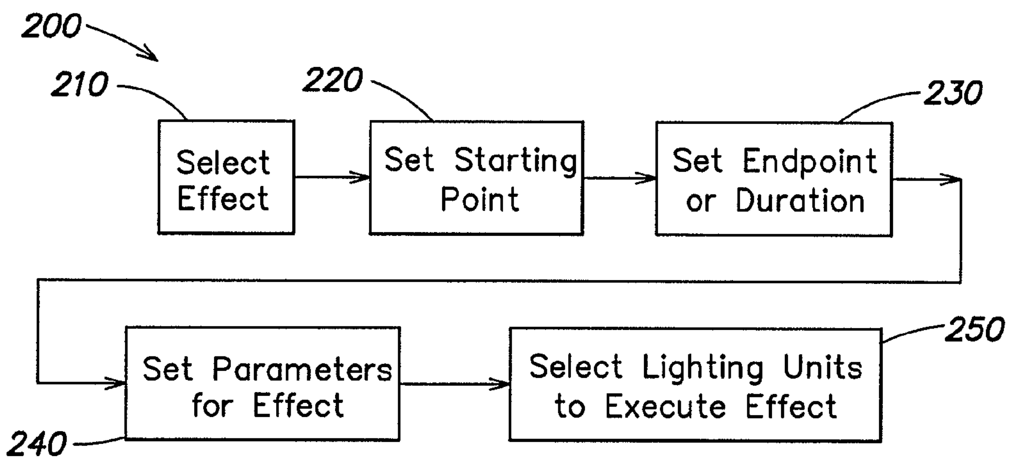
FIG. 2 presents an exemplary method for creating a lighting effect as described herein.

According to a method 200 for creating a lighting sequence set forth in FIG. 2, a user may select from among a set of predetermined 'stock' effects 210. The stock effects function as discrete elements or building blocks useful for assembling a sequence. Additionally, a user may compose a particular sequence and include that sequence in the stock effects to eliminate the need for creating repeated elements de novo each time the effect is desired. For example, the set of stock effects may include a dimming effect and a brightening effect. A user may compose a pulse effect by specifying the alternation of the dimming and brightening effects, and include the pulse effect in the set of stock effects. Thus, each time a pulse effect is thereafter required, the stock effect can be utilized without the need for repeatedly selecting dimming and brightening effects to achieve the same goal. In certain embodiments, stock effects may also be created by a user via any programming language, such as Java, C, C++, or any other suitable language. Effects may be added to the set of stock effects by providing the effects as plug-ins, by including the effects in an effects file, or by any other technique suitable for organizing effects in a manner that permits adding, deleting, and altering the set of effects.

Additionally, a user may select an effect and indicate a time at which that effect should begin 220. For example, the user may indicate that a brightening effect should start three minutes after a sequence commences. Additionally, the user may select an ending time or duration for the effect 230. Thus, by indicating that the effect should end five minutes after the sequence commences, or equivalently by indicating that the effect should last for two minutes, a user may set the time parameters of the brightening effect. Additional parameters may be specified by the user, as may be appropriate for the particular effect 240. For example, a brightening or dimming effect may be further defined by an initial brightness and an ending brightness. The rate of change may be predetermined, i.e., the dimming effect may apply a linear rate of dimming over the assigned time span, or may be alterable by the user, e.g., may permit slow dimming at the beginning followed by a rapid drop-off, or by any other scheme the user specifies.

Similarly, a pulse effect, as described above, might instead by characterized by a maximum brightness, a minimum brightness, and a periodicity, or rate of alternation. Additionally, the mode of alternation may be alterable by the user, e.g., the changes in brightness may reflect a sine function or alternating linear changes. In embodiments wherein color-changing light units 40 are employed, parameters such as initial color, final color, rate of change, etc. may be specified by the user. Many additional effects and suitable parameters therefor are known or will be apparent to those of skill in the art, and fall within the scope of this disclosure. As shown in box 250 of FIG. 2, a user also may select one or more lighting units to execute one or more effects.

In certain embodiments, a user may specify a transition between two effects which occur in sequence. For example, when a pulse effect is followed by a dimming effect, the pulse effect may alternate less rapidly, grow gradually dimmer, or vary less between maximum and minimum brightness towards the termination of the effect. Techniques for transitioning between these or other may be determined by the user for each transition, e.g., by selecting a transition effect from a set of predetermined transition effects, or by setting transition parameters for the beginning and/or end of one or both effects.

In a further embodiment, users may specify multiple lighting effects for the same lighting unit that place effects overlapping in time or in location. These overlapping effects may be used in an additive or subtractive manner such that the multiple effects interact with each other. For example, a user could impose a brightening effect on a pulsing effect the brightening effect imposing the minimum brightness parameter of the pulse to give the effect of pulsing slowly growing to a steady light.

In another embodiment, the overlapping lighting effects could have priorities or cues attached to them which could allow a particular lighting unit to change effect on the receipt of a cue. This cue could be any type of cue, received externally or internally to the system, and includes, but is not limited to, a user-triggered cue such as a manual switch or bump button; a user-defined cue such as a certain keystroke combination or a timing key allowing a user to tap or pace for a certain effect; a cue generated by the system such as an internal clocking mechanism, an internal memory one, or a software based one; a mechanical cue generated from an analog or digital device attached to the system such as a clock, external light sensor, music synchronization device, sound level detection device, or a manual device such as a switch; a cue received over a transmission medium such as an electrical wire or cable, RF signal or IR signal; or a cue received from a lighting unit attached to the system. The priority could allow the system to choose a default priority effect that is the effect used by the lighting unit unless a particular cue is received, at which point the system instructs the use of a different effect. This change of effect could be temporary occurring only while the cue occurs or defined for a specified period, could be permanent not allowing for further receipt of other effects or cues, or could be priority based, waiting for a new cue to return to the original effect or select a new one. Alternatively, the system could select effects based on the state of a cue and the importance of a desired effect. For instance, if a sound sensor sensed sudden noise, it could trigger a high priority alarm lighting effect overriding all the effects otherwise present or awaiting execution. The priority could also be state dependent where a cue selects an alternative effect or is ignored depending on the current state of the system.

In certain embodiments, the outcome of one effect may be programmed to depend upon a second effect. For example, an effect assigned to one lighting unit may be a random color effect, and an effect assigned to a second lighting unit may be designated to match the color of the random color effect. Alternatively, one lighting unit may be programmed to execute an effect, such as a flashing effect, whenever a second lighting unit meets a certain condition, such as being turned off. Even more complex arrangements, such as an effect which is initiated upon a certain condition of one effect, matches the color of another effect, the rate of a third effect, can be created by this scheme. Other combinations of effects wherein at least one parameter or occurrence of an effect is dependent on a parameter or occurrence of a second effect will be apparent to those of skill in the art and are intended to fall within the scope of this disclosure.

In still other embodiments, the systems and methods described herein permit a lighting sequence to be influenced by external inputs during performance. For example, a lighting sequence or effect may be programmed to start upon receipt of a trigger signal, a sequence or effect may take precedence if a signal is received, a sequence or effect may be designated to repeat or continue until a signal is received, etc. Thus, instead of assigning a discrete start time to an effect or sequence, a user may instead designate that effect or sequence to begin when a certain stimulus is received. Furthermore, during creation, a user may designate two or more effects for overlapping or concurrent time periods and assign the effects different priorities or conditions to determine which effect is executed upon playback. In yet another embodiment, a user may link a parameter for an effect to an external input, including analog, digital and manual inputs, such that the color, speed, or other attribute of an effect may depend on a signal from an external device, measuring, for example, volume, brightness, temperature, pitch, inclination, wave length, or any other appropriate condition. Thus, the selection of a lighting sequence, the selection of an effect, or the selection of a parameter may be determined or influenced by input from an external source, such as a user, chronometer, device, or sensor.

In event-driven embodiments, such as those using external inputs and those using outputs of other effects as inputs, a menu may be provided to define inputs and the consequences thereof. For example, a palette of predetermined inputs may be provided to a user. Each input, such as a specified transducer or the output of another effect, may be selected and placed within an authored lighting sequence as a trigger for a new effect, or as a trigger to a variation in an existing effect. Known inputs may include, for example, thermistors, clocks, keyboards, numeric keypads, Musical Instrument Digital Interface ("MIDI") inputs, DMX control signals, TTL or CMOS logical signals, other visual or audio signals, or any other protocol, standard, or other signaling or control technique having a predetermined form whether analog, digital, manual, or any other form. The palette may also include a custom input, represented as, for example, an icon in a palette, or an option in a drop-down menu. The custom input may allow a user to define the voltage, current, duration, and/or form (i.e., sinusoid, pulse, step, modulation) for an input signal that will operate as a control or trigger in a sequence.

For instance, a theatrical lighting sequence may include programmed lighting sequences and special effects in the order in which they occur, but requiring input at specified points before the next sequence or portion thereof is executed. In this way, scene changes may take place not automatically as a function of timing alone, but at the cue of a director, producer, stage hand, or other participant. Similarly, effects which need to be timed with an action on the stage, such as brightening when an actor lights a candle or flips a switch, dramatic flashes of lightning, etc., can be indicated precisely by a director, producer, stage hand, or other participant—even an actor—thereby reducing the difficulty and risk of relying on preprogrammed timing alone.

Input from sensors can also be used to modify lighting sequences. For example, a light sensor may be used to modify the brightness of the lights, for example, to maintain a constant lighting level regardless of the amount of sunlight entering a room, or to make sure a lighting effect is prominent despite the presence of other sources of light. A motion sensor or other detector may be used as a trigger to start or alter a lighting sequence. For example, a user may program a lighting sequence for advertising or display purposes to change when a person approaches a sales counter or display. Temperature sensors may also be used to provide input. For example, the color of light in a freezer may be programmed to be dependent on temperature, e.g., providing blue light to indicate cold temperature, changing gradually to red as the temperature rises, until a critical temperature is reached, whereupon a flashing or other warning effect may begin. Similarly, an alarm system may be used to provide a signal that triggers a lighting sequence or effect for providing a warning, distress signal, or other indication. An interactive lighting sequence may be created, e.g., wherein the executed effect varies according to a person's position, movements, or other actions.

Figure 3:
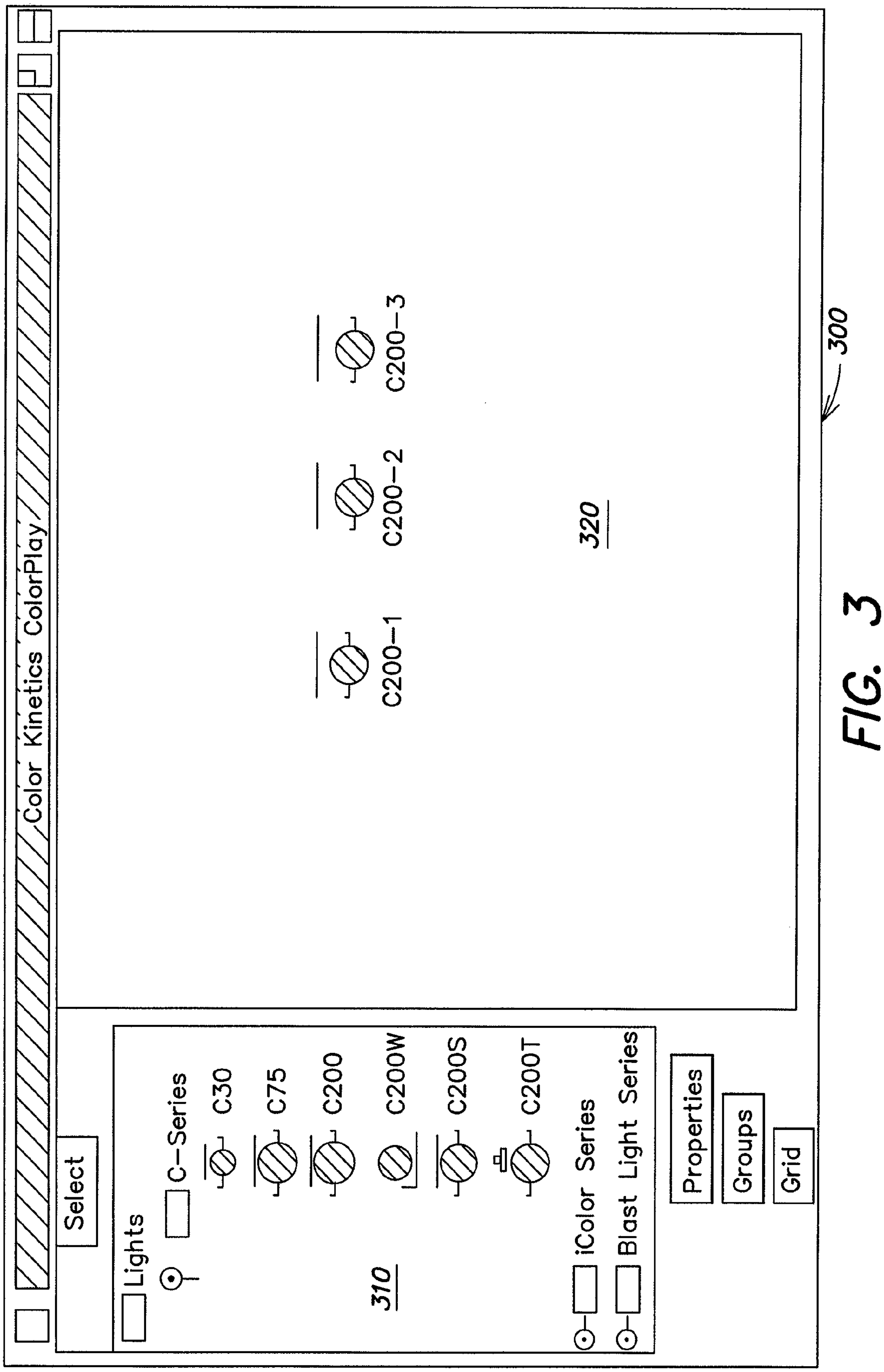
FIG. 3 depicts a representative interface for describing an arrangement of lighting units.

In certain embodiments, a user may provide information representative of the number and types of lighting units and the spatial relationships between them. For example, an interface 300 may be provided as depicted in FIG. 3, such as a grid or other two-dimensional array, that permits the user to arrange icons or other representative elements to represent the arrangement of the lighting units being used. In one embodiment, depicted in FIG. 3, the interface 300 provides to a user a selection of standard types of lighting units 310, e.g., cove lights, lamps, spotlights, etc., such as by providing a selection of types of lighting units in a menu, on a palette, on a toolbar, etc. The user may then select and arrange the lighting units on the interface, e.g., within layout space 320 in an arrangement which approximates the physical arrangement of the actual lighting units.

In certain embodiments, the lighting units may be organized into different groups, e.g., to facilitate manipulation of a large number of lighting units. Lighting units may be organized into groups based on spatial relationships, functional relationships, types of lighting units, or any other scheme desired by the user. Spatial arrangements can be helpful for entering and carrying out lighting effects easily. For example, if a group of lights are arranged in a row and this information is provided to the system, the system can then implement effects such as a rainbow or a sequential flash without need for a user to specify a separate and individual program for each lighting unit. All the above types of implementation or effects could be used on a group of units as well as on single lighting units. The use of groups can also allow a user to enter a single commend or cue to control a predetermined selection of lighting units.

A lighting sequence can be tested or executed on a lighting system to experience the effects created by the user. Additionally, the interface 300 may be capable of reproducing a lighting sequence created by the user, for example, by recreating the programmed effects as though the icons on the interface were the lighting units to be controlled. Thus, if a lighting sequence specified that a certain lighting unit gradually brightens to a medium intensity, upon playback, the icon representing that lighting unit may start black and gradually lighten to gray. Similarly, color changes, flashing, and other effects can be visually represented on the interface. This function may permit a user to present a wholly or partially created lighting sequence on a monitor or other video terminal, pause playback, and modify the lighting sequence before resuming playback, to provide a highly interactive method for show creation. In a further embodiment, the system could allow fast-forwarding, reversing, rewinding, or other functions to allow editing of any portion of the lighting sequence. In a still further embodiment, the system could use additional interface features like those known in the art. This can include, but is not limited to, non-linear editing such as that used in the Adobe or such devices or controls as scrolls, drag bars, or other devices and controls.

Figure 4:
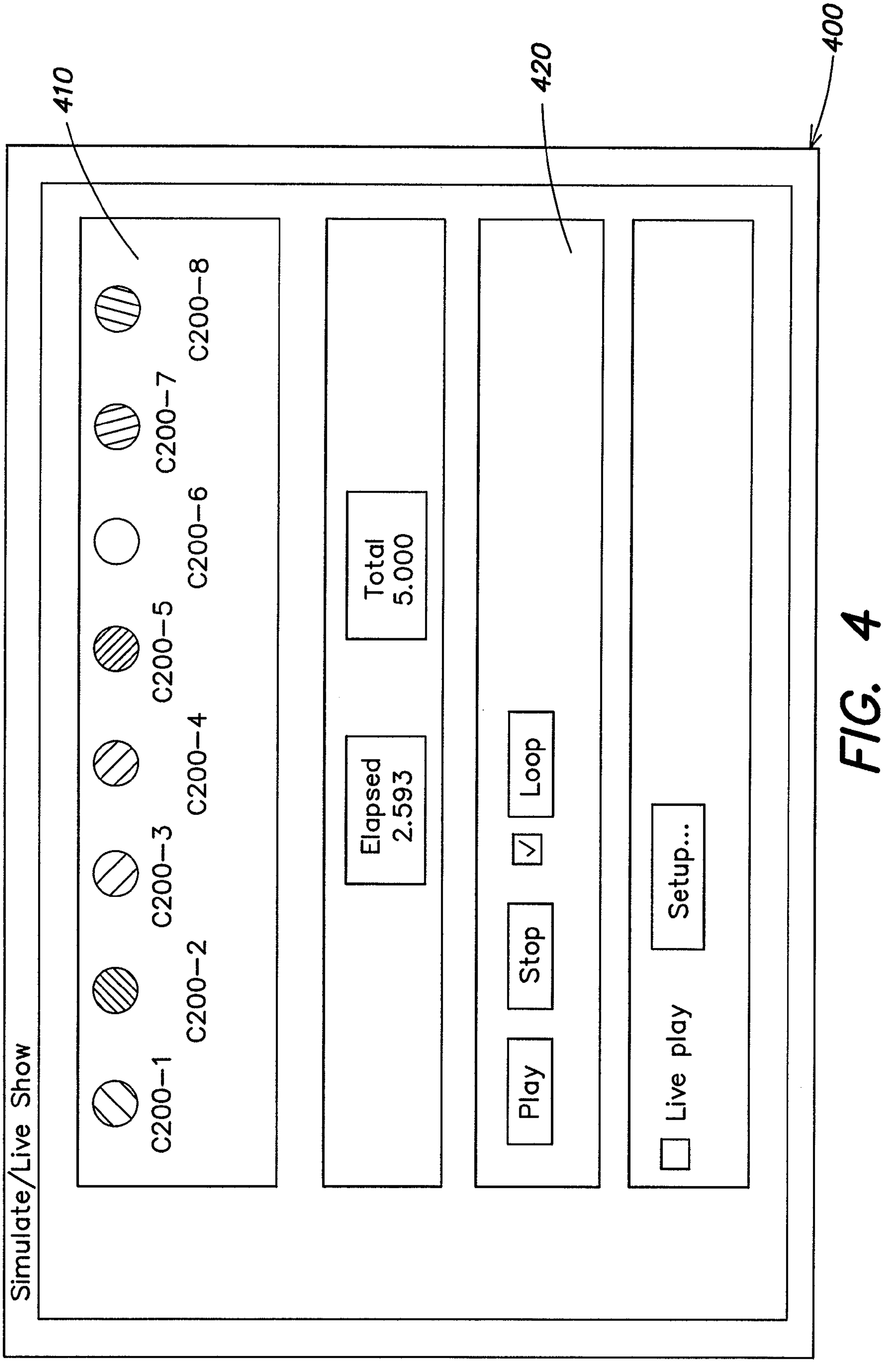
FIG. 4 represents an alternate interface for graphically reproducing a lighting sequence.

An alternate interface 400 for reproducing a lighting sequence is presented in FIG. 4. Interface 400 includes representations of lighting elements 410 and playback controls 420. Other techniques for visualizing a lighting sequence will be apparent to those of skill in the art and may be employed without departing from the scope and spirit of this disclosure.

Figure 5:
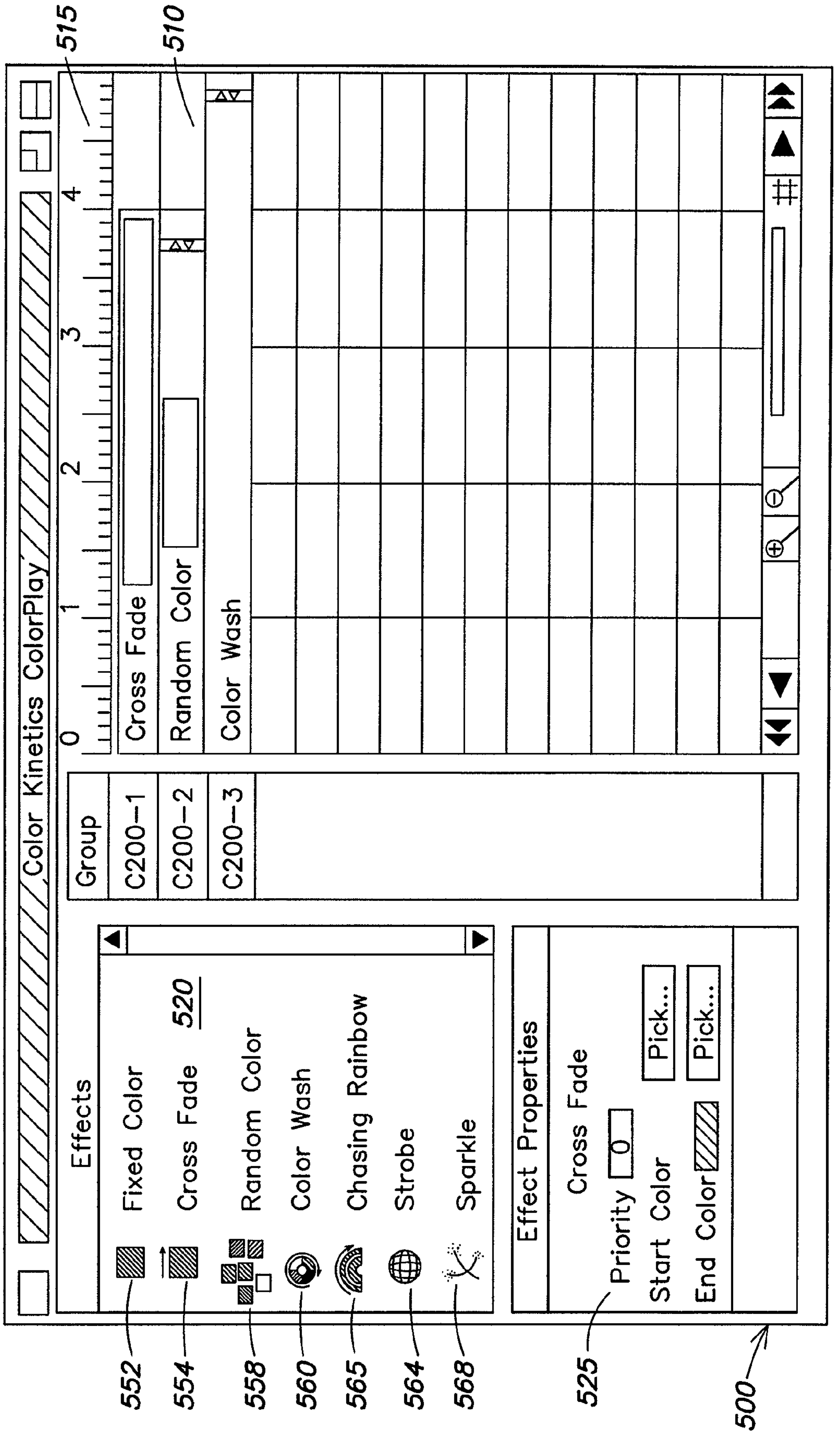
FIG. 5 portrays a representative interface for creating a lighting sequence as described herein.

An interface capable of representing the lighting sequence may also be used during entry of the lighting sequence. For example, a grid, such as interface 15 of FIG. 1, may be employed, wherein available lighting units are represented along one axis and time is represented along a second axis. Thus, when a user specifies that a certain lighting unit gradually brightens to a medium intensity, the portion of the grid defined by that lighting unit, the start time, and the ending time may appear black at one end of the grid portion and gradually lighten to gray at the other end of the grid portion. In this way, the effect can be visually represented to the user on the interface as the lighting sequence is being created. In certain embodiments, effects that are difficult to represent with a static representation, such as flashing, random color changes, etc., can be represented kinetically on the interface, e.g., by flashing or randomly changing the color of the defined grid portion. An example of an interface 500 representing a sequence for an assortment of three lighting units is shown in FIG. 5. Time chart 510 visually depicts the output of each of the three lights at each moment in time according to the temporal axis 515. At a glance, the user can readily determine what effect is assigned to any lighting unit at any point in time, simplifying the coordination of effects across multiple lighting units and allowing rapid review of the lighting sequence.

Additionally, FIG. 5 depicts a palette 520 which includes the stock effects from which a user may select lighting effects, although other techniques for providing the set of stock effects, such as by a menu, toolbar, etc., may be employed in the systems and methods described herein. In palette 520 there are provided icons for stock effects for the lighting of a fixed color effect 552, a cross fade between two color effects 554, a random color effect 558, a color high effect 560, a chasing rainbow effect 565, a strobe effect 564, and a sparkle effect 568. This list is by no means exhaustive and other types of effects could be included as would be obvious to one of skill in the art. To assign an effect to a lighting unit, the user may select an effect from the palette and select a region of the grid corresponding to the appropriate lighting unit or units and the desired time interval for the effect. Additional parameters may be set by any suitable technique, such as by entering numerical values, selecting options from a palette, menu, or toolbar, drawing a vector, or any other technique known in the art, such as the parameter entry field 525. Other interfaces and techniques for entry of lighting sequences suitable for performing some or all of the various functions described herein may be used and are intended to be encompassed by the scope of this disclosure. Examples of functions and interfaces suitable for use with the invention may be found in "A Digital Video Primer," June, 2000, by the Adobe Dynamic Media Group, Adobe Systems, Inc., incorporated herein by reference.

The methods described above can be readily adapted for controlling units other than lighting units. For example, in a theatrical setting, fog machines, sound effects, wind machines, curtains, bubble machines, projectors, stage practicals, stage elevators, pyrotechnical devices, backdrops, and any other features capable of being controlled by a computer may be controlled by a sequence as described herein. In this way, multiple events can be automated and timed. For example, the user may program the lights to begin to brighten as the curtain goes up, followed by the sound of a gunshot as the fog rolls over the stage. In a home, for example, a program can be used to turn on lights and sound an alarm at 7:00 and turn on a coffee maker fifteen minutes later. Holiday lighting arrays, e.g., on trees or houses, can be synchronized with the motion of mechanical figurines or musical recordings. An exhibit or amusement ride can coordinate precipitation, wind, sound, and lights in a simulated thunderstorm. A greenhouse, livestock barn, or other setting for growing living entities can synchronize ambient lighting with automated feeding and watering devices. Any combination of electromechanical devices can be timed and/or coordinated by the systems and methods described herein. Such devices may be represented on an interface for creating the sequence as additional lines on a grid, e.g., one line for each separate component being controlled, or by any other suitable means. Effects of these other devices can also be visually represented to the user. For instance, continued use of a smoke machine could slowly haze out other grids, a coffee maker could be represented by a small representation of a coffee maker that appears to brew coffee on the interface as the action occurs at the device or the interface can show a bar slowing changing color as feed is dispensed in a livestock barn. Other such static or dynamic effects would be readily apparent to one of skill in the art and are all incorporated within this disclosure.

In certain embodiments, wherein the lighting units are capable of motion, e.g., by sliding, pivoting, rotating, tilting, etc., the user may include instructions for the motion or movement of lighting units. This function may be accomplished by any means. For example, if the lighting unit includes a motor or other system capable of causing movement, the desired movement may be effected by selecting a motion effect from a set of motion effects, as described for lighting effects above. Thus, for example, a lighting unit capable of rotating on its base may be selected, and a rainbow wash effect may be programmed to occur simultaneously with a rotating motion effect. In other embodiments, lighting units may be mounted on movable platforms or supports which can be controlled independently of the lights, e.g., by providing an additional line on a grid interface as described above. Motion effects may also have parameters, such as speed and amount (e.g., an angle, a distance, etc.), that can be specified by the user. Such light/motion combinations may be useful in a wide variety of situations, such as light shows, planetarium presentations, moving spotlights, and any other scenario in which programmable moving lights may be desirable.

Similarly, instructions for controlling objects placed between a lighting unit and an object being illuminated, such as gobos, stencils, filters, lenses, irises and other objects through which light may pass, can be provided by a user according to the systems and methods described herein. In this manner, an even wider array of lighting effects may be designed and preprogrammed for later execution.

One embodiment of the systems and methods described herein is a computer system, such as processor 10 depicted in FIG. 1, configured to design or create a lighting sequence according to the systems and methods described herein, e.g., by executing a computer program in a computer language either interpreted or compiled, e.g., Fortran, C, Java, C++, etc. In an additional embodiment, the systems and methods described herein relate to a disk, CD, or other permanent computer-readable storage medium that encodes a computer program capable of performing some or all of the functions described above which enable a user to create or design a lighting sequence which can be used to control a plurality of lighting units.

A lighting sequence may be recorded on a storage medium, such as a compact disk, floppy disk, hard drive, magnetic tape, volatile or non-volatile solid state memory device, or any other permanent computer-readable storage medium. The lighting sequence may be stored in a manner that records the effects and their parameters as created by a user, in a manner that converts that format into a format which represents the final data stream, e.g., suitable for directly controlling lighting units or other devices, or in any other format suitable for executing the lighting sequence. In embodiments wherein the sequence is stored as a data stream, the system may permit a user to choose from a selection of data formats such as DMX, RS-485, RS-232, etc. Additionally, lighting sequences may be linked to each other, e.g., such that at the conclusion of one sequence, another sequence is executed, or a master sequence may be created for coordinating the execution of a plurality of subsequences, e.g., based on external signals, conditions, time, randomly, etc. In certain embodiments, a lighting sequence 20 may be executed directly from a processor 10, although in other embodiments, a lighting sequence 20 may be executed using a controller 30 as described below.

Figure 6:
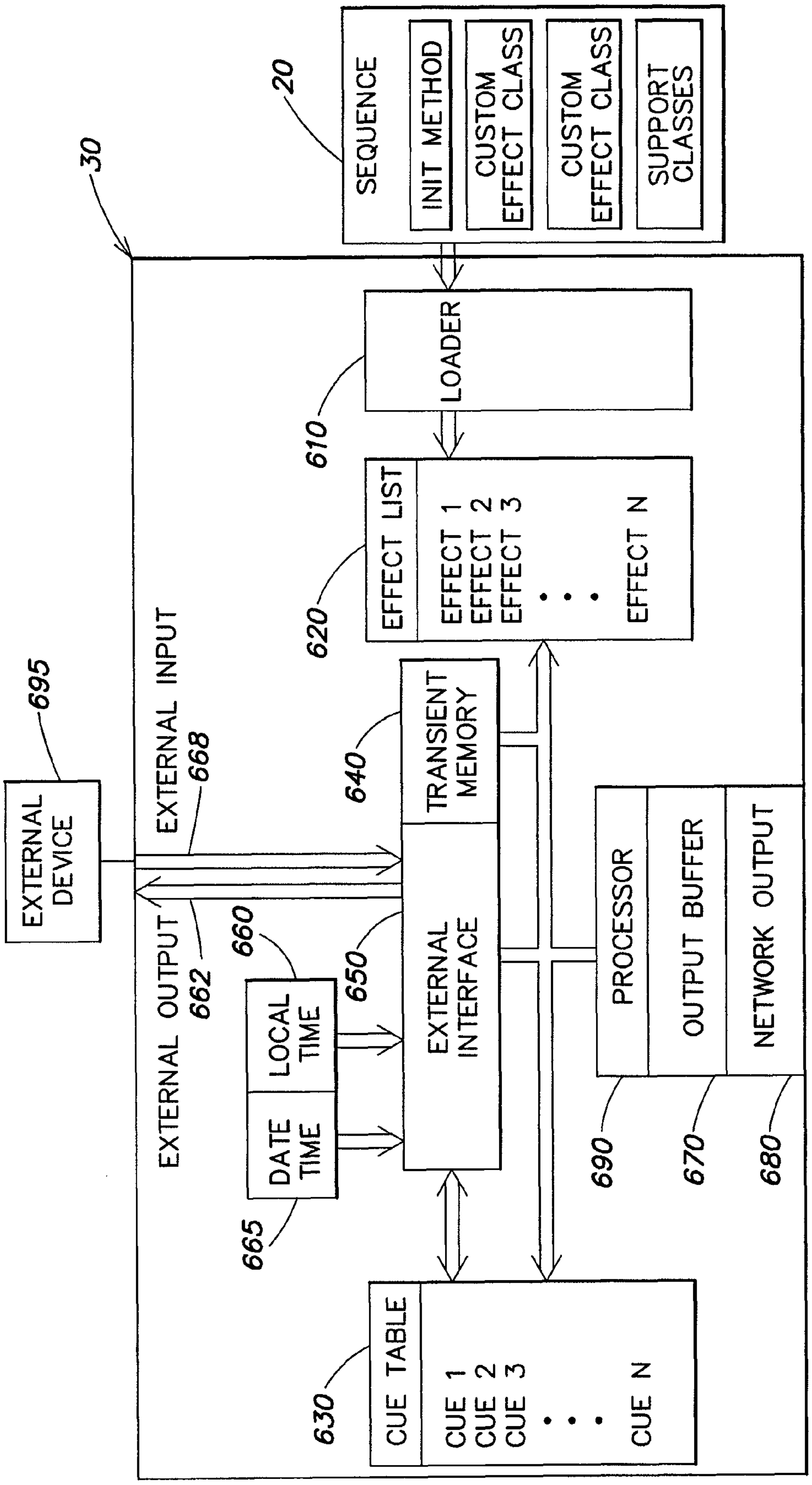
FIG. 6 shows one embodiment of a controller for executing a lighting sequence as described herein.

A controller 30, as depicted in FIG. 6, may be used to execute lighting sequences 20 which have been programmed, designed, or created on a different apparatus. Because the controller 30 may provide a narrower range of functions than the processor used to create the sequence, the controller 30 may contain less hardware and be less expensive than a more complex system which permits authoring, includes a video monitor, or has other auxiliary functionality. The controller 30 may employ any suitable loader interface 610 for receiving a lighting program 20, e.g., an interface for reading a lighting program 20 from a storage medium such as a compact disk, diskette, magnetic tape, smart card, or other device, or an interface for receiving a transmission from another system, such as a serial port, USB port, parallel port, IR receiver, or other connection for receiving a lighting program 20. In certain embodiments, the lighting program 20 may be transmitted over the Internet. The controller 30 may also include a processor 690 and an interface for communicating with a plurality of lighting units 40.

A controller 30 may begin execution of a lighting sequence 20 upon loading the lighting sequence 20, upon receiving a command or signal from a user or a device or sensor; at a specified time, or upon any other suitable condition. The condition for initiation may be included in the lighting sequence 20, or may be determined by the configuration of the controller 30. Additionally, in certain embodiments, the controller may begin execution of a lighting sequence 20 starting from a point in the middle of the lighting sequence 20. For example, the controller 30 may, upon receiving a request from the user, execute a lighting sequence 20 starting from a point three minutes from the beginning of the sequence, or at any other specified point, e.g., from the fifth effect, etc. The controller 30 may, upon receiving a signal from a user or a device or sensor, pause the playback, and, upon receiving a suitable signal, resume playback from the point of pausing.

The controller may continue to execute the lighting sequence 20 until the sequence terminates, until a command or signal is received from a user or a device or sensor, until a specified time, or until any other suitable condition.

A controller 30 may include a memory unit, database, or other suitable module 620 for storing a plurality of predetermined stock effects and instructions for converting those effects into a data format, such as DMX, RS-485, or RS-232, suitable for controlling a plurality of lighting units. The memory module 620 may be preconfigured for a set of stock effects, the memory module 620 may receive effects and instructions from the lighting sequence 20, or the memory module 620 may include a preconfigured set of stock effects which can be supplemented by additional effects stored in lighting sequence 20. Preconfiguring the memory module 620 with a set of stock effects permits a reduction in the memory required to store a lighting sequence 20, because the lighting sequence 20 may omit conversion instructions for effects preconfigured into the controller 30. In embodiments wherein the lighting sequence 20 includes stock effects designed by the author, suitable instructions may be included in lighting sequence 20 and stored in memory module 620, e.g., upon loading or execution of the lighting sequence 20 by the processor 690.

The controller 30 may include an external interface 650 whereby the controller 30 can receive external signals useful for modifying the execution of the lighting sequence 20. For example, the external interface 650 may include a user interface, which may in turn include switches, buttons, dials, sliders, a console, a keyboard, or any other device, such as a sensor, whereby a user may provide a command or signal to the controller 30 or otherwise influence the execution or output of the lighting sequence 20. The external interface 650 may receive temporal information from one or more chronometers, such as a local time module 660 which functions as a counter for measuring time from a predetermined starting point, such as when the controller 30 is turned on or when the counter is reset, or a date time module 665 which calculates the current date and time. Additionally, the controller 30 may receive commands or signals from one or more external devices 695 or sensors through external input 668. Such devices may be coupled to controller 30 directly, or signals may be received by the controller through an IR sensor or other suitable interface. Signals received by the controller 30 may be compared to or interpreted by a cue table 630, which may contain information relating to the various inputs or conditions designated by the author of the lighting sequence 20 to affect the execution or output of the lighting sequence 20. Thus, if the controller 30 compares an input to the cue table 630 and determines that a condition has been satisfied or a designated signal has been received, the controller 30 may then alter the execution or output of the lighting sequence 20 as indicated by the program.

In certain embodiments, the controller may respond to external signals in ways that are not determined by the contents and instructions of the lighting sequence 20. For example, the external interface 650 may include a dial, slider, or other feature by which a user may alter the rate of progression of the lighting sequence 20, e.g., by changing the speed of the local time counter 660, or by altering the interpretation of this counter by the controller 30. Similarly, the external interface 650 may include a feature by which a user may adjust the brightness, color, or other characteristic of the output. In certain embodiments, a lighting sequence 20 may include instructions to receive a parameter for an effect from a feature or other user interface on the external interface 650, permitting user control over specific effects during playback, rather than over the output or system of lighting units as a whole.

The controller 30 may also include a transient memory 640. The transient memory 640 may store temporary information, such as the current state of each lighting unit under its control, which may be useful as a reference for the execution of the lighting sequence 20. For example, as described above, some effects may use output of another effect to define a parameter; such effects may retrieve the output of the other effect as it is stored in the transient memory 640. Those of skill in the art will recognize other situations in which a transient memory 640 may be useful, and such uses are intended to be encompassed by the present disclosure.

The controller 30 may send the data created by the execution of lighting sequence 20 to lighting units by providing the data to a network output 680, optionally through the intermediacy of an output buffer 670. Signals to additional devices may be transmitted through the network out put 680, or through a separate external output 662, as convenient or desirable. The data may be transmitted through data connections such as wires or cables, as IR or RF transmissions, other suitable methods for data transfer, or any combination of methods capable of controlling lighting units and/or other devices.

In certain embodiments, the controller 30 may not communicate directly with the lighting units, but may instead communicate with one or more subcontrollers which, in turn, control the lighting units or another level of subcontrollers, etc. The use of subcontrollers permits distributive allocation of computational requirements. An example of such a system which uses this sort of distributional scheme is disclosed in U.S. Pat. No. 5,769,527 to Taylor, described therein as a "master/slave" control system. For the systems and methods described herein, communication between the various levels may be unidirectional, wherein the controller 30 provides instructions or subroutines to be executed by the subcontrollers, or bidirectional, where subcontrollers relay information back to the controller 30, for example, to provide information useful for effects which rely on the output of other effects as described above, for synchronization, or for any other conceivable purpose.

Although the description above illustrates one particular configuration of a controller 30, other configurations for achieving the same or similar functions will be apparent to those of skill in the art, and such variations and modifications are intended to be encompassed by the present invention. The example below more particularly describes an embodiment of a controller 30 such as described above.

The following describes one embodiment of a controller according to the systems and methods described herein, as exemplified in FIG. 6, including the design and format of a show representation, management of external inputs and outputs, interpretation and execution of shows, and generation of DMX compliant output. The controller architecture of this embodiment uses a Java-based object-oriented design; however, other object-oriented, structured, or other programming languages may be used with the invention.

The controller architecture permits effects to be based on external environmental conditions or other input. An effect is a predetermined output involving one or more lighting units. For example, fixed color, color wash, and rainbow wash are all types of effects. An effect may be further defined by one or more parameters, which specify, for example, lights to control, colors to use, speed of the effect, or other aspects of an effect. The environment refers to any external information that may be used as an input to modify or control an effect, such as the current time or external inputs such as switches, buttons, or other transducers capable of generating control signals, or events generated by other software or effects. Finally, an effect may contain one or more states, so that the effect can retain information over the course of time. A combination of the state, the environment, and the parameters may be used to fully define the output of an effect at any moment in time, and over the passage of time.

In addition, the controller may implement effect priorities. For example, different effects may be assigned to the same lights. By utilizing a priority scheme, only the highest priority effect will determine the light output. When multiple effects control a light at the same priority the final output may be an average or other combination of the effect outputs.

A lighting sequence as described above may be deployed as a program fragment. Such fragments may be compiled in an intermediate format, such as by using an available Java compiler to compile the program as byte codes. In such a byte code format, the fragment may be called a sequence. A sequence may be interpreted or executed by the controller 30. The sequence is not a stand-alone program, and adheres to a defined format, such as an instantiation of an object from a class, that the controller 30 may use to generate effects. When downloaded into the controller 30 (via serial port, infrared port, smart card, or some other interface), the controller 30 interprets the sequence, executing portions based on time or input stimuli.

A building block for producing a show is an effect object. The effect object includes instructions for producing one specific effect, such as color wash, cross fade, or fixed color, based on initial parameters (such as which lights to control, start color, wash period, etc.) and inputs (such as time, environmental conditions, or results from other effect objects). The sequence contains all of the information to generate every effect object for the show. The controller 30 instantiates all of the effect objects one time when the show is started, then periodically sequentially activates each one. Based on the state of the entire system, each effect object can programmatically decide if and how to change the lights it is controlling.

The run-time environment software running on the controller 30 may be referred to as a conductor. The conductor may be responsible for downloading sequences, building and maintaining a list of effect object instances, managing the interface to external inputs and outputs (including DMX), managing the time clock, and periodically invoking each effect object. The conductor also maintains a memory that objects can use to communicate with each other.

The controller 30 may maintain two different, but synchronized, representations of time. The first is LocalTime, which is the number of milliseconds since the controller 30 has been turned on. LocalTime may be represented as a 32-bit integer that will roll over after reaching its maximum value. The other time representation is DateTime, which is a defined structure maintaining the time of day (to seconds resolution) as well as the day, month, and year.

LocalTime may be used by effects for computing relative changes, such as a hue change since last execution in a color wash effect. LocalTime roll-over should not cause effects to fail or malfunction. The conductor may provide utility functions for common operations like time deltas.

An effect object may be an instance of an Effect class. Each effect object may provide two public methods which are subclassed from Effect to produce the desired effect. These are the constructor and the run() methods.

The constructor method may be called by a sequence when an instance of the effect is created. It can have any number and type of parameters necessary to produce the desired effect variations. The authoring software may be responsible for producing the proper constructor parameters when creating the sequence.

The first argument to the constructor may be an integer identifier (ID). The ID may be assigned by the show authoring software, and may be unique.

The constructor may call super() to perform any conductor-specific initializations.

The effect class may also contain next and prev members, which are used by the sequence and conductor to maintain a linked list of effects. These members may not be accessed internally by the effect methods.

Certain typical effects may be used over and over again. These typical effects may be provided by the conductor, minimizing the storage/download size of sequences. The typical effects may, if desired, be further sub-classed.

A sequence is a convenient means of bundling together all of the information necessary to produce a show. The sequence may have only one required public method, init(), which is called once by the conductor prior to running the show. The init() method may instantiate every effect used by the show, passing the ID and any parameters as constructor arguments. The init() method may then link the effect objects together into a linked list, and return the list to the conductor.

The linked list is maintained through the next and prev members of the effect objects. The prev member of the first object is nil, and the next member of the last object is nil. The first effect is returned as the value of init().

The optional dispose() method will be called when the sequence is deactivated. This method can be used to clean up any resources allocated by the sequence. Automatic processes may be used independently to handle any allocated memory. The base class dispose() will pass through the linked list and free the effect objects, so when dispose() is subclassed, it may be necessary to call super().

The optional public method String getSequenceInfo() can be used to return version and copyright information. It may be desirable to implement some additional getsequence*() routines to return information that maybe useful for the controller/user interface.

A sequence may require additional supporting classes. These may be included, along with the sequence object, in a file such as a JAR (Java ARchive) file. The JAR file may then be downloaded to the conductor. Tools for JAR files are part of the standard Java development tools.

Any DMX communication may be handled by a DMX Interface class. Each instance of a DMX Interface controls one DMX universe. The DMX Interface base class may be sub-classed to communicate over a specific type of hardware interface (serial, parallel, USB).

A channel may be a single data byte at a particular location in the DMX universe. A frame may be all of the channels in the universe. The number of channels in the universe is specified when the class is instantiated.

Internally, DMX_Interface maintains three buffers, each the length of the number of channels: the last frame of channels that was sent, the next frame of channels waiting to be sent, and the most recent priority of the data for each channel. Effect modules may modify the channel data waiting to be sent via the SetChannel() method, and the conductor may ask for the frame to be sent via SendFrame().

When an effect object sets the data for a particular channel it may also assign that data a priority. If the priority is greater than the priority of the last data set for that channel, then the new data may supercede the old data. If the priority is lesser, then the old value may be retained. If the priorities are equal, then the new data value may be added to a running total and a counter for that channel may be incremented. When the frame is sent, the sum of the data values for each channel may be divided by the channel counter to produce an average value for the highest priority data.

After each frame has been sent, the channel priorities may all be reset to zero. The to-be-sent data may be retained, so if no new data is written for a given channel it will maintain its last value, and also copied to a buffer in case any effect objects are interested.

An exemplary DMX Interface may implement the following methods:

A DMX Interface int num_channels) method is a constructor that sets up a DMX universe of num_channels (24 . . . 512) channels. When subclassed, the method may take additional arguments to specify hardware port information.

A void SetChannel(int channel, int data, int priority) method sets the to-be-sent data (0 . . . 255) for the channel if the priority is greater than the current data priority. The method can throw error handling exceptions, such as ChannelOutOfRange and DataOutOfRange exceptions.

A void SetChannels(int first_channel, int num_channels, int data[], int priority) method sets num_channels of to-be-sent data for starting with first_channel from the array data. The method can throw error handling exceptions, such as ChannelOutOfRange, DataOutOfRange, and ArrayIndexOutOfBounds exceptions.

A int GetChannelLast(int channel) method returns the last data sent for the channel. The method can throw error handling exceptions, such as ChannelOutOfRange or NoDataSent exceptions.

A void SendFrame(void) method causes the current frame to be sent. This is accomplished through a separate thread so processing by the conductor will not pause. If a frame is already in progress, it is terminated and the new frame started.

A int FrameInProgress (void), if no frame is currently being sent, returns zero. If a frame is in progress, it returns the number of the last channel sent.

The conductor is the run-time component of the controller that unites the various data and input elements. The conductor may download sequences, manage the user interface, manage the time clock and other external inputs, and sequence through the active effect objects.

The technique for downloading the sequence JAR file into the conductor can vary depending on the hardware and transport mechanism. Various Java tools can be utilized for interpreting the JAR format. In an embodiment, the sequence object and various required classes may be loaded into memory, along with a reference to the sequence object.

In an embodiment, more than one sequence object may be loaded into the conductor, and only one sequence may be active. The conductor can activate a sequence based on external inputs, such as the user interface or the time of day.

If a sequence is already active, then prior to activating a new sequence, the dispose() method is invoked for the already active sequence.

To activate a sequence, the sequence's init() method is called and run to completion.

Controllers may invoke some method for measuring time. Time values may be accessed via GetLocalTime() and GetDateTime() methods. Other inputs may be enumerated and accessed by a reference integer. The values of all inputs may also be mapped to integers. A GetInput(int ref) method returns the value of input ref, and can throw exceptions, such as a NoSuchInput exception.

The effect list may be created and returned by the sequence's init() method. At fixed intervals the conductor may sequentially call the run method of each effect object in the list.

The interval may be specific to the particular controller hardware, and may be alterable, e.g., by an external interface. If the effect list execution does not finish in one interval period, the next iteration may be delayed until the following interval time. Effect objects may not need to run every interval to compute changes, but may use a difference between the current time and the previous time.

Effects may be designed to minimize the use of processing power, so the entire effect list can be run quickly. If an effect requires a large amount of computation, it may initiate a low priority thread to do the task. While the thread is running, the run() method may return right away, so the lights will remain unchanged. When the run() method detects that the thread has finished, it may use the results to update the light outputs.

The memory allows different effects to communicate with each other. Like external inputs, memory elements may be integers. Memory elements may be referenced by two pieces of information: the ID of the effect that created the information, and a reference integer which is unique to that effect. The accessor methods are:

```
void SetScratch(int effect_id, int ref_num, int value)
int GetScratch(int effect_id, int ref_num)
```

Both methods can throw error handling exceptions, such as NoSuchEffect and NoSuchReference exceptions.

Effects may run in any order. Effects that use results from other effects may anticipate receiving results from the previous iteration.

Additional routines may include the following.

An int DeltaTime(int last) method computes the change in time between the current time and last.

A DMX_Interface GetUniverse(int num) method returns the DMX_Interface object associated with universe number num. This value should not change while a sequence is running, so it can be cached. The method can throw error handling exceptions, such as NoSuchUniverse exceptions.

An int[] HSBtoRGB(int hue, int sat, int bright) method converts hue (0-1535), saturation (0-255), and brightness (0-255) into red/green/blue values, which are written to the first three elements of the resulting array. The method can throw error handling exceptions, such as ValueOutOfRange exceptions.

An int LightToDMX(int light) method returns the DMX address of a light with a logical number of light. The method can throw error handling exceptions, such as DMXAddressOutOfRange exceptions.

A void LinkEffects(Effect a, Effect b) method sets a.next=b; b.prev=a.

Each controller may have a configuration file used by the show authoring software. The configuration file may contain mappings between the input reference integers and more useful descriptions of their functions and values, for example, something like: Input 2="Slider" range=(0-99). The configuration file can also contain other useful information, such as a number of DMX universes.

The following is an example of code illustrating a lighting sequence authored according to the principles of the invention. It will be understood that the following example is in no way limiting:

EXAMPLE 1

```
// An example sequence.
// Runs one strip of 12 cove lights, sequentially numbered starting at
address 1
// Input #1 is a binary switch
// The cove runs a continuous color wash
// When the switch is opened, a chaser strobe effect is triggered, which
runs a
// white strobe down cove. The effect won't be repeated until the
switch is reset.
import java.sequence.*
public class ExampleSequence extends Sequence {
private int CoveGroup[ ] = {
LightToDMX(1), LightToDMX(2), LightToDMX(3), LightToDMX(4),
LightToDMX(5), LightToDMX(6), LightToDMX(7), LightToDMX(8),
LightToDMX(9), LightToDMX(10), LightToDMX(11), LightToDMX(12)
};
public String getSequenceInfo( ) {
return "Example sequence version 1.0";
}
public Effect init( ) {
super.init( );                         // Call base class init
// Create the effect objects with the appropriate variation params
washEff =
new WashEffect(
1,                                     // ID
CoveGroup, 1, 1,                       // Which lights, universe 1,
                                       priority 1
true,                                  // Direction = forward
200000);                               // Speed (20 seconds)
strobeEff=new ChaseStrobeEffect(
2,     // ID
CoveGroup, 1, 2,                       // Which lights, universe 1,
                                       priority 2
1,     // Trigger input
true,  // Direction = forward
100,   // Duration of strobe (100 ms)
400,   //Time between strobes (400 ms)
255, 255, 255);                        // Strobe color (white)
// Link the effects
LinkEffects(washEff, strobeEff)        // Sets next and prev
// Return the effect list to the conductor
return(washEff);
}
// Declare all of the effects
WashEffect washEff;
ChaseStrobeEffect strobeEff;
}
// WashEffect may be implemented as a stock effect, but we'll
implement a simple
// version here for illustration.
public class WashEffect extends Effect {
private int hue, sat, bright;
private int last_time;                 // Last time we ran
private int lights[ ];
private DMX_Interface universe;
private int priority;
private boolean direction;
private int speed;
public WashEffect(int id, int lights[ ], int univ, int prio, boolean dir,
int speed) {
// make copies of variation params and initialize any
// other variables
this.lights = lights;
this.universe = GetUniverse(univ);
this.priority = prio;
this.direction = dir;
this.speed = speed;
hue = 0;
sat = 255;
bright = 255;
last_time = 0;
super(id);
}
```

Figure 7:
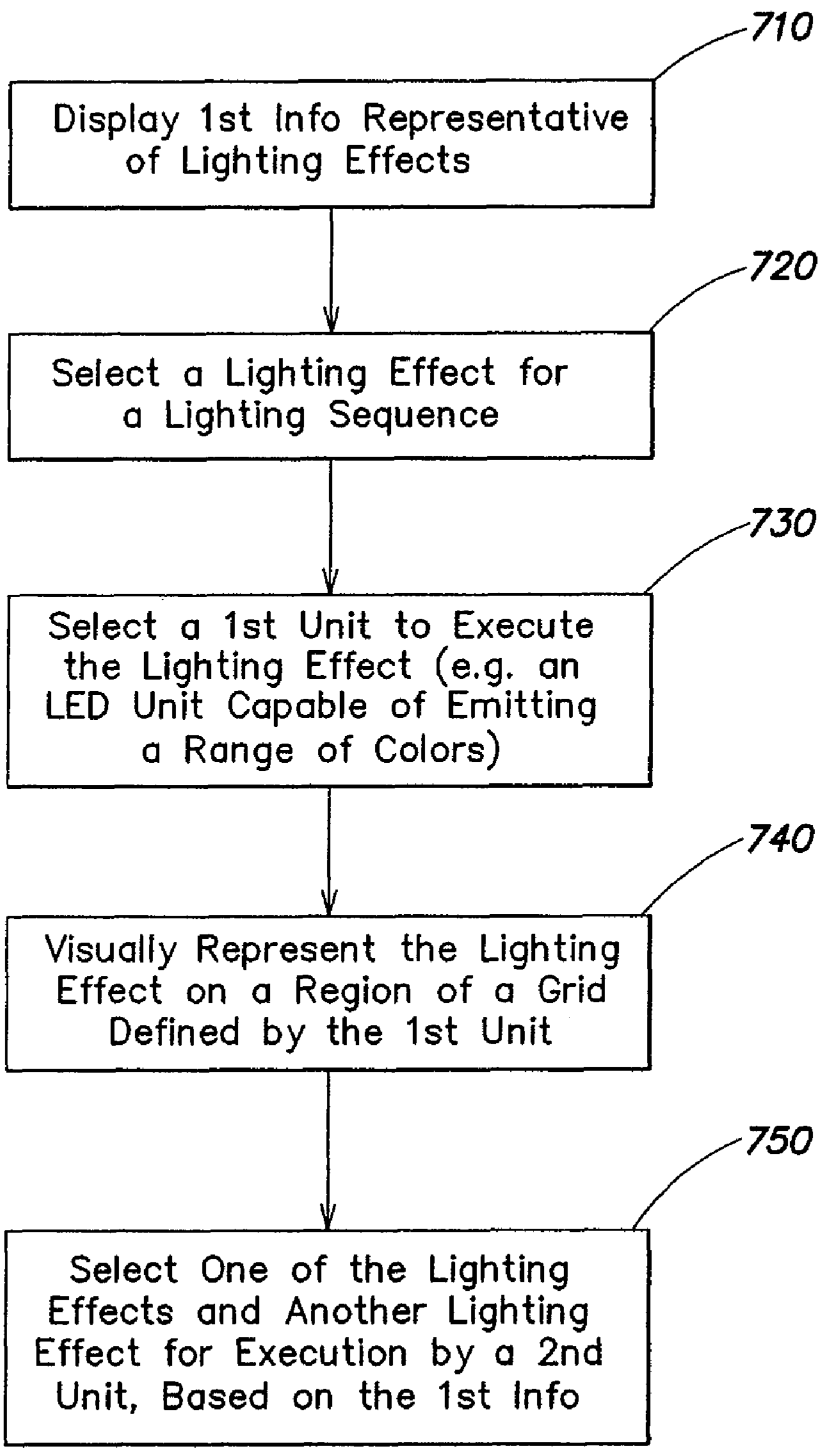
FIG. 7 is a flowchart illustrating an example of a method for preparing a lighting sequence according to one aspect of the present invention.

FIG. 7 is a flowchart illustrating one example of a method for preparing a lighting sequence according to an aspect of the present inventions at step 710, first information representative of a plurality of lighting effects in displayed. At step 720, first lighting effect is selected for a lighting sequence, from the plurality of lighting effects. At step 730, a first lighting unit is selected to execute the lighting effect. For example, the lighting unit may be an LED unit capable of emitting a range of colors. At step 740, the first lighting effect is visually represented on a region of a grid defined by the first unit. At step 750, one of the first lighting effect and another of the plurality of lighting effects is selected, from among the plurality of displayed lighting effects, for execution by a second lighting unit.

Figure 8:
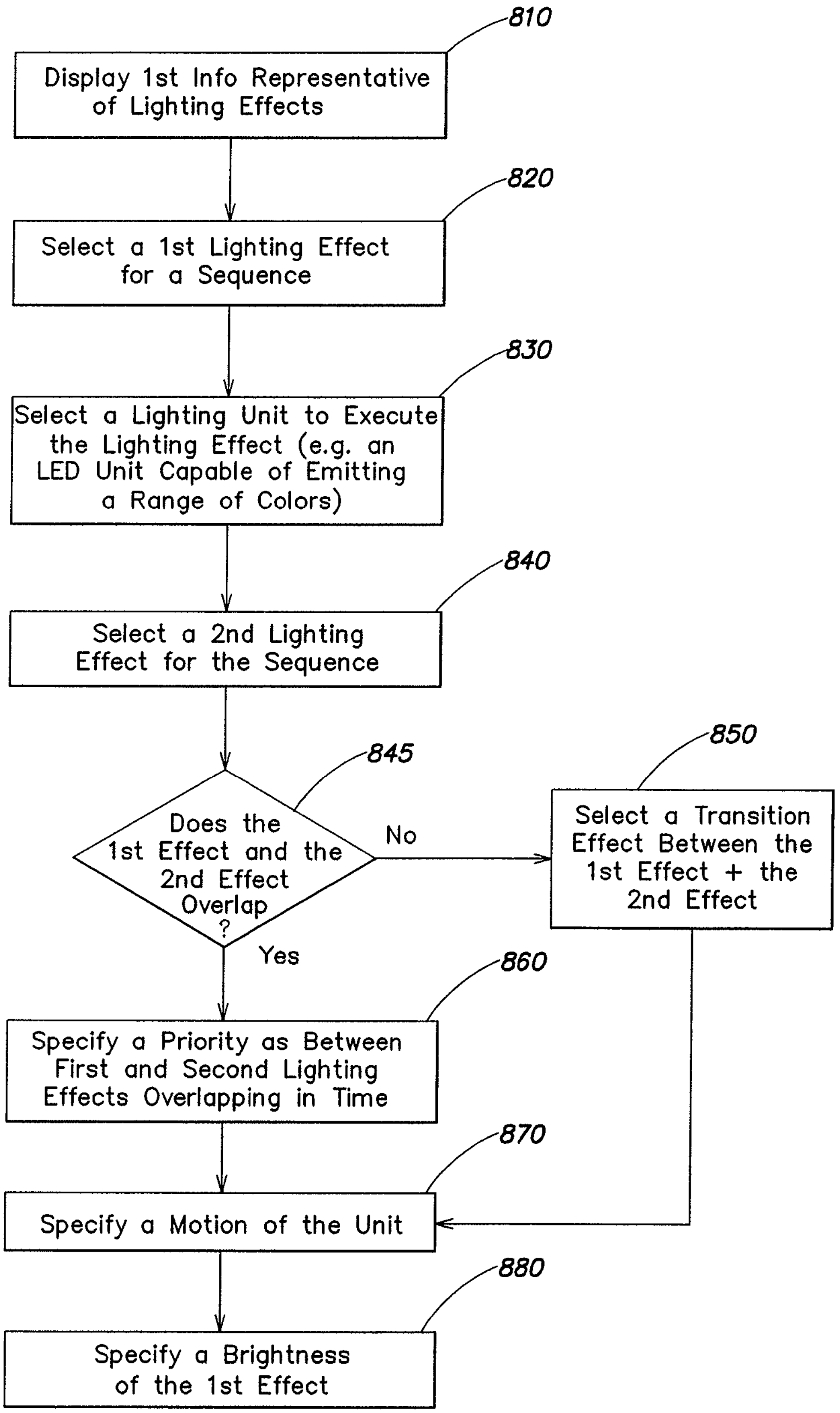
FIG. 8 is a flowchart illustrating an example of a method of preparing a lighting sequence according to another aspect of the present invention.

FIG. 8 is a flow chart illustrating an example of a method of preparing a lighting sequence according to another aspect of the present invention. At step 810, first information representative of a plurality of lighting effects is displayed. At step 820, a first lighting effect is selected for a lighting sequence, from the plurality of lighting effects. At step 830, a first lighting unit is selected to execute the lighting effect. For example, the lighting unit may be an LED unit capable of emitting a range of colors. At step 840, a second lighting effect is selected for the lighting sequence. At step 845, the method queries of the first lighting effect and the second lighting effect overlap. If the first effect and the second effect do not overlap, at step 850, a transition effect is selected for execution between the first effect and the second effect. If the first effect and the second effect do overlap, at step 860, a priority between the first effect and the second effect is specified. At step 870, a motion of the first lighting unit also may be specified. At step 880, a brightness of the first lighting effect also may be specified.

All articles, patents, and other references set forth above are hereby incorporated by reference. While the invention has been disclosed in connection with the embodiments shown and described in detail, various equivalents, modifications, and improvements will be apparent to one of ordinary skill in the art from the above description. Such equivalents, modifications, and improvements are intended to be encompassed by the following claims.

The invention claimed is:

1. An apparatus for controlling at least one lighting unit, comprising:

a data interface for receiving processor executable instructions for controlling the at least one lighting unit to generate at least one lighting sequence;

a signal interface for receiving at least one external signal generated by at least one external device disposed remotely from the apparatus;

a processor for processing said processor executable instructions to provide a data stream representing the at least one lighting sequence, the processor altering the processor executable instructions based on the at least one external signal to change at least one parameter or effect of the lighting sequence as the at least one lighting unit continues to generate the at least one lighting sequence, wherein the at least one external signal encodes the measurement of one or more of: volume, pitch, and inclination; and a data output for transmitting the data stream to the at least one lighting unit.

2. The apparatus of claim 1, in combination with the at least one external device.

3. The apparatus of claim 1, wherein said signal interface includes a port for receiving an electromagnetic signal.

4. The apparatus of claim 1, wherein said data output includes a port for transmitting data to a mechanical device other than a lighting unit.

5. The apparatus of claim 1, wherein said data output includes a port for transmitting data to a device for reproducing an audio signal.

6. The apparatus of claim 1, wherein said data output includes a port for transmitting data to a device for reproducing a video image.

7. The apparatus of claim 1, wherein the processor is a first processor, and wherein said data interface is a data connection for receiving the processor executable instructions from a second processor.

8. The apparatus of claim 7, wherein said data connection comprises one of an infrared port, a serial port, a parallel port, an RF port, a wireless port and a USB port.

9. The apparatus of claim 1, wherein said data interface is capable of reading the processor executable instructions from a storage medium.

10. The apparatus of claim 9, wherein said storage medium is selected from one of a magnetic disk, magnetic tape, a smart card, volatile solid state memory, non-volatile solid state memory and a compact disk.

11. The apparatus of claim 1, further comprising:

a database to store directions for converting predetermined lighting effects having parameters associated therewith into data suitable for controlling the at least one lighting unit.

12. The apparatus of claim 1, further comprising:

a memory module for storing information representative of effects being executed by the at least one lighting unit.

13. The apparatus of claim 1, further comprising:

a timing mechanism for measuring intervals of time.

14. The apparatus of claim 1, further comprising:

a first timing mechanism for measuring elapsed time; and a second timing mechanism for determining the date and time of day.

15. The apparatus of claim 1, wherein the at least one lighting unit includes at least one LED lighting unit capable of emitting light of any of a range of colors, and wherein the processor is adapted to set a color of the at least one LED lighting unit.

16. The combination of claim 2, wherein the at least one external device includes at least one of a user interface, a sensor, a timing device, a music synchronization device, and a sound level detection device.

17. The combination of claim 16, wherein the at least one external device includes at least one user interface, and wherein the at least one user interface includes at least one of:

at least one switch;

at least one button;

at least one dial;

at least one slider;

at least one console; and at least one keyboard.

18. The combination of claim 17, wherein the processor alters the processing of the processor executable instructions to change at least one of:

a priority amongst at least two different lighting effects in the at least one lighting sequence;

an execution speed of the at least one lighting sequence;

a brightness of light emitted by the at least one lighting unit; and a color of light emitted by the at least one lighting unit, based on the at least one external signal provided by the at least one user interface.

19. The combination of claim 17, wherein the processor executable instructions received at the data interface include at least two different lighting sequences including the at least one lighting sequence, and wherein the processor is adapted to selectively execute the at least one lighting sequence of the at least two different lighting sequences based on the at least one external signal provided by the at least one user interface.

20. The apparatus of claim 1, wherein the signal interface includes at least one user interface.

21. The apparatus of claim 20, wherein the at least one user interface includes at least one of:

at least one switch;

at least one button;

at least one dial;

at least one slider;

at least one console; and at least one keyboard.

22. The apparatus of claim 21, wherein the processor alters the processing of the processor executable instructions to change at least one of:

a priority amongst at least two different lighting effects in the at least one lighting sequence;

an execution speed of the at least one lighting sequence;

a brightness of light emitted by the at least one lighting unit; and a color of light emitted by the at least one lighting unit, based on the at least one external signal provided by the at least one user interface.

23. The apparatus of claim 21, wherein the processor executable instructions received at the data interface include at least two different lighting sequences including the at least one lighting sequence, and wherein the processor is adapted to selectively execute the at least one lighting sequence of the at least two different lighting sequences based on the at least one external signal provided by the at least one user interface.

24. The apparatus of claim 1, wherein the processor alters the processing of the processor executable instructions to change at least one of:

a priority amongst at least two different lighting effects in the at least one lighting sequence;

an execution speed of the at least one lighting sequence;

a brightness of light emitted by the at least one lighting unit; and a color of light emitted by the at least one lighting unit, based on the at least one external signal.

25. The apparatus of claim 1, wherein the processor executable instructions received at the data interface include at least two different lighting sequences including the at least one lighting sequence, and wherein the processor is adapted to selectively execute the at least one lighting sequence of the at least two different lighting sequences based on the at least one external signal.

26. The apparatus of claim 1, in combination with the at least one lighting unit.

27. A method for controlling at least one lighting unit, comprising acts of:

receiving, from a remote location, processor executable instructions for controlling the at least one lighting unit to generate at least one lighting sequence;

monitoring at least one input for at least one external signal;

processing said processor executable instructions to provide a data stream representing the at least one lighting sequence;

altering the processor executable instructions based on the at least one external signal to change at least one parameter or effect of the at least one lighting sequence as the at least one lighting unit continues to generate the at least one lighting sequence, wherein the at least one external signal encodes the measurement of one or more of: volume, pitch and inclination; and transmitting the data stream to the at least one lighting unit.

28. The method of claim 27, wherein the act of monitoring at least one input includes an act of monitoring at least one user interface for the at least one external signal.

29. The method of claim 27, wherein the act of monitoring at least one input includes an act of monitoring the at least one input for an electromagnetic signal.

30. The method of claim 27, wherein the act of transmitting the data stream includes an act of transmitting data to a mechanical device other than a lighting unit.

31. The method of claim 27, wherein the act of transmitting the data stream includes an act of transmitting data to a device for reproducing an audio signal.

32. The method of claim 27, wherein the act of transmitting the data stream includes an act of transmitting data to a device for reproducing a video image.

33. The method of claim 27, wherein the act of receiving processor executable instructions includes an act of receiving the processor executable instructions from a processor.

34. The method of claim 27, wherein the act of receiving processor executable instructions includes an act of receiving the processor executable instructions via an infrared port, a serial port, a parallel port, or a USB port.

35. The method of claim 27, wherein the act of receiving processor executable instructions includes an act of reading the processor executable instructions from a storage medium.

36. The method of claim 35, wherein the act of reading the processor executable instructions from a storage medium includes an act of reading data from one of a magnetic disk, magnetic tape, a smart card, and a compact disk.

37. The method of claim 27, wherein the act of receiving processor executable instructions includes an act of receiving a plurality of lighting effects having parameters associated therewith.

38. The method of claim 37, further comprising an act of:

utilizing directions for converting predetermined lighting effects to convert said plurality of lighting effects into data suitable for controlling the at least one lighting unit.

39. The method of claim 27, further comprising an act of:

storing information representative of effects being executed by the at least one lighting unit in a transient memory.

40. The method of claim 27, wherein the act of monitoring at least one input includes an act of monitoring a timing mechanism for the at least one external signal.

41. The method of claim 27, wherein the act of monitoring at least one input includes an act of monitoring a first timing mechanism for measuring elapsed time, and a second timing mechanism for determining the date and time of day.

42. The method of claim 27, wherein the act of monitoring at least one input includes an act of monitoring a sensor for the at least one external signal.

43. The method of claim 27, wherein the act of monitoring at least one input includes an act of receiving an alarm signal.

44. The method of claim 27, wherein the act of transmitting the data stream includes an act of setting a color of an LED lighting unit capable of emitting light of any of a range of colors.

45. The method of claim 27, wherein the act of altering the processor executable instructions based on the at least one external signal includes an act of repeating an effect until the at least one external signal is received.

46. The method of claim 27, wherein the act of altering the processor executable instructions based on the at least one external signal includes an act of modifying a rate of the at least one lighting sequence.

47. The method of claim 27, wherein the act of altering the processor executable instructions based on the at least one external signal includes an act of switching from a high priority effect to a low priority effect.

48. The method of claim 27, wherein the act of altering the processor executable instructions based on the at least one external signal includes an act of interrupting the at least one lighting sequence to execute a different effect.

49. The method of claim 27, wherein:

the act of receiving processor executable instructions includes an act of receiving a primary lighting effect and a secondary lighting effect, the secondary lighting effect designated to be executed instead of the primary lighting effect upon a predetermined condition;

the act of processing the processor executable instructions includes an act of providing the data stream such that the at least one lighting unit executes the primary lighting effect;

the act of monitoring at least one input includes an act of receiving a signal indicative of the predetermined condition; and the act of altering the processor executable instructions includes an act of providing the data stream such that the at least one lighting unit executes the secondary lighting effect.

50. The method of claim 27, wherein the act of altering the processor executable instructions includes an act of altering a rate of the at least one lighting sequence.

51. The method of claim 27, wherein:

the act of receiving processor executable instructions includes an act of receiving processor executable instructions for executing at least two sequences of lighting effects including the at least one lighting sequence;

the act of transmitting the data stream includes an act of executing a first sequence of the at least two sequences of lighting effects utilizing the at least one lighting unit; and the act of altering the processor executable instructions includes an act of executing a different sequence of the at least two sequences of lighting effects.

52. The method of claim 27, wherein the act of altering the processor executable instructions includes an act of pausing during the at least one lighting sequence.

53. The method of claim 27, wherein the act of altering the processor executable instructions includes an act of changing a brightness of light emitted by the at least one lighting unit.

54. The method of claim 27, wherein the act of altering the processor executable instructions includes an act of changing a color of light emitted by the at least one lighting unit.

55. The method of claim 27, wherein the act of monitoring at least one input includes an act of monitoring at least one external device for the at least one external signal.

56. The method of claim 55, wherein the act of monitoring at least one external device includes an act of monitoring at least one user interface for the at least one external signal.

57. At least one computer readable medium encoded with at least one program that, when executed, performs the method of claim 27.

* * * * *